(12) United States Patent
Prasad et al.

(10) Patent No.: US 10,836,781 B2
(45) Date of Patent: Nov. 17, 2020

(54) PROCESS FOR THE PREPARATION OF TETROFOSMIN OR ACID SALT THEREOF

(71) Applicant: Jubilant Generics Limited, Uttar Pradesh (IN)

(72) Inventors: Mokkapati Umamaheshwar Prasad, Uttar Pradesh (IN); Anjul Kumar, Uttar Pradesh (IN); Shishupal Singh, Uttar Pradesh (IN); Dharam Vir, Uttar Pradesh (IN)

(73) Assignee: JUBILANT GENERICS LIMITED, Uttar Pradesh (IN)

( * ) Notice: Subject to any disclaimer, the term of this patent is extended or adjusted under 35 U.S.C. 154(b) by 0 days.

(21) Appl. No.: 15/750,480

(22) PCT Filed: Nov. 20, 2017

(86) PCT No.: PCT/IB2017/057251
§ 371 (c)(1),
(2) Date: Feb. 5, 2018

(87) PCT Pub. No.: WO2018/162964
PCT Pub. Date: Sep. 13, 2018

(65) Prior Publication Data
US 2019/0382423 A1    Dec. 19, 2019

(30) Foreign Application Priority Data

Mar. 8, 2017    (IN) .............................. 201711008041

(51) Int. Cl.
*C07F 9/50*    (2006.01)
(52) U.S. Cl.
CPC ............ *C07F 9/509* (2013.01); *C07F 9/5027* (2013.01)

(58) Field of Classification Search
None
See application file for complete search history.

(56) References Cited

U.S. PATENT DOCUMENTS 5,045,302 A    9/1991 Kelly et al.

FOREIGN PATENT DOCUMENTS

| CN | 1184225 C | 1/2005 |
| WO | WO 2006/064175 A1 | 6/2006 |
| WO | WO 2015/114002 A1 | 8/2015 |

OTHER PUBLICATIONS

Chadwell, S.J. et al. 1995 "Synthesis and characterization of Group 10 metal complexes with a new trifunctional ether phosphine. The x-ray crystal structures of Bis[Bis(2-ethoxyethyl)benzylphosphine}dichloronickel(II) and Bis[Bis(2-ethoxyethyl)benzylphosphine]chlorophenylnickel(II)" *Polyhedron* 14(8): 1057-1065.

Reid, R. G. et al. 2000 "The synthesis of [$^{14}$C]tetrofosmin, a compound vital to the development of Myoview™" Proceedings of the International Symposium, 7th, Dresden, Germany, Jun. 18-22, 2000 by Amersham Pharmacia Biotech UK Limited.

*Primary Examiner* — Ana Z Muresan
(74) *Attorney, Agent, or Firm* — Knobbe, Martens, Olson & Bear, LLP (57) ABSTRACT

The present invention relates to an improved process for the preparation of tetrofosmin or acid addition salt thereof. The present invention also relates to the process for the preparation of tetrofosmin disulfosalicylate salt. Further the present invention also provides the polymorphic form J of disulfosalicylate salt of tetrofosmin.

13 Claims, 1 Drawing Sheet

PROCESS FOR THE PREPARATION OF TETROFOSMIN OR ACID SALT THEREOF

FIELD OF THE INVENTION

The present invention relates to an improved process for the preparation of tetrofosmin or acid addition salt thereof. The present invention also relates to the process for the preparation of disulfosalicylate salt of tetrofosmin.

BACKGROUND OF THE INVENTION

Technetium ($^{99m}$Tc) tetrofosmin is a drug used in nuclear medicine cardiac imaging. It is sold under the brand name Myoview (GE Healthcare). The radioisotope, technetium-99m, is chelated by two 1, 2-bis-[bis-(2-ethoxyethyl)phosphino]ethane ligands, which belong to the group of diphosphines and which are referred to as tetrofosmin and has the structural Formula 1:

Formula 1

$^{99m}$Tc-based radiopharmaceuticals are commonly used in diagnostic nuclear medicine, especially for in vivo imaging (e.g. via immunoscintigraphy or radiolabeling). Usually cold kits are manufactured in advance in accordance with strict requirements of Good Manufacturing Practice (GMP) Guidelines, containing the chemical ingredients (e.g. $^{99m}$Tc-coordinating ligands, preservatives) in lyophilized form. The radioactive isotope $^{99m}$Tc ($t_{1/2}$=6 h) is added to those kits shortly before application to the patient via intravenous or subcutaneous injection.

Tc-99m tetrofosmin is rapidly taken up by myocardial tissue and reaches its maximum level in approximately 5 minutes. About 66% of the total injected dose is excreted within 48 hours after injection (40% urine, 26% feces). Tc-99m tetrofosmin is indicated for use in scintigraphic imaging of the myocardium under stress and rest conditions. It is used to determine areas of reversible ischemia and infarcted tissue in the heart. It is also indicated to detect changes in perfusion induced by pharmacologic stress (adenosine, lexiscan, dobutamine or persantine) in patients with coronary artery disease. Its third indication is to assess left ventricular function (ejection fraction) in patients thought to have heart disease. No contraindications are known for use of Tc-99m tetrofosmin, but care should be taken to constantly monitor the cardiac function in patients with known or suspected coronary artery disease. Patients should be encouraged to void their bladders as soon as the images are gathered, and as often as possible after the tests to decrease their radiation doses, since the majority of elimination is renal. The recommended dose of Tc-99m tetrofosmin is between 5 and 33 millicuries (185-1221 megabecquerels). For a two-dose stress/rest dosing, the typical dose is normally a 10 mCi dose, followed one to four hours later by a dose of 30 mCi. Imaging normally begins 15 minutes following injection.

$^{99m}$Tc-Tetrofosmin is also described to be useful for tumor diagnostics, in particular of breast cancer and parathyroid gland cancer, and for multidrug resistance (MDR) research.

U.S. Pat. No. 5,045,302 discloses $^{99m}$Tc-coordinating diphosphine ligands (L), wherein one preferred example thereof is the ether functionalized diphosphine ligand 1,2-bis[bis(2-ethoxy-ethyl)phosphino]ethane according to Formula 1, called tetrofosmin ("P53"), that forms a dimeric cationic technetium (V) dioxo phosphine complex, [TcO$_2$L$_2$] with $^{99m}$Tc, useful as myocardial imaging agent. Example 1 of said patent described the process for preparing tetrofosmin by reacting ethyl vinyl ether, bis(diphosphino) ethane in the presence of α-azo-isobutyronitrile (AIBN) in a fischer pressure-bottle equipped with a teflon stirring bar followed by removal of volatile materials and non-distillable material obtained, as per below mentioned Scheme 1.

CN1184225C discloses tetrofosmin salts containing chloride or bromide or aryl sulfonates as negatively charged counter ions, which can be used for the preparation of a $^{99m}$Tc-Tetrofosmin radiopharmaceutical composition. According to this patent tetrofosmin hydrochloride is a viscous liquid. Own experiments of the inventors of the present invention revealed that the halide salts of tetrofosmin are hygroscopic oils, which are complicated to handle, e.g. when weighed. The oily and hygrospcopic properties of tetrofosmin hydrochloride hampers its use in pharmaceutical preparations. Attempts to synthesize the sulfosalicylate salt of tetrofosmin failed because the starting material sulfosalicylic acid was not soluble in ether in the concentration specified in the patent (3.4 g in 15 ml).

WO2006/064175A1 discloses tetrofosmin was converted to tetrofosmin sulfosalicylate by reaction with 2.3 to 2.5 molar equivalents of 5-sulfosalicyclic acid at room temperature in ethanol, followed by recrystallisation from ethanol/ether.

WO2015/114002A1 relates to tetrafluoroborate salt of tetrafosmin and its process for the preparation thereof. Further this application also discloses one-vial and two vial kit formulation with tetrafluoroborate salt of tetrafosmin.

The article Proceedings of the International Symposium, 7th, Dresden, Germany, Jun. 18-22, 2000 by Amersham Pharmacia Biotech UK Limited titled "The synthesis of [$^{14}$C]tetrofosmin, a compound vital to the development of Myoview, Synthesis and Applications of Isotopically Labelled Compounds" disclosed a process for the preparation of tetrofosmin as per below mentioned Scheme 2:

Scheme 2

The starting material was bis(2-ethoxyethyl)benzylphosphine of Formula 4. This was prepared from benzyl phosphonate, $PhCH_2P(O)(OEt)_2$ by reduction with lithium aluminium hydride to give the intermediate benzylphosphine, $PhCH_2PH_2$, followed by a photolysis reaction in the presence of ethyl vinyl ether to give compound of Formula 4. The compound of Formula 4 in acetonitrile was treated with dibromo[U-$^{14}$C]ethane to give compound of Formula 6, further it was treated with excess of 30% aqueous sodium hydroxide in ethanol. The mixture was stirred at room temperature for 24 hours. The solvent was removed and the residue was treated with excess concentrated hydrochloric acid at 0° C. Aqueous work up gave compound of Formula 7. Then compound of Formula 7 in dry benzene was treated with hexachlorodisilane and hydrolysed with excess 30% aqueous sodium hydroxide at 0° C. Aqueous work up followed by flash column chromatography on silica gave [bisphosphinoethane-1,2-$^{14}$C]tetrofosmin of formula 1A.

The article Polyhedron (1995), 14(8), 1057-65, titled "Synthesis and characterization of Group 10 metal complexes with a new trifunctional ether phosphine. The X-ray crystal structures of bis[bis(2-ethoxyethyl)benzylphosphine] dichloronickel(II) and bis[bis(2-ethoxyethyl)benzylphosphine]chlorophenylnickel(II)" disclosed the process for the preparation of bis(2-ethoxyethyl)benzylphosphine as per below mentioned Scheme 3:

Scheme 3

The compound bis(2-ethoxyethyl)benzylphosphine of Formula 4 was prepared by first reduction of diethylbenzylphosphonate of Formula 8 using lithium aluminium hydride to obtain benzyl phosphine of Formula 9 followed by radical catalysed coupling reaction with ethyl vinyl ether carried out by using UV photolysis.

Tetrofosmin is extremely sensitive to atmospheric oxygen, which makes synthesis of the substance, as well as manufacturing and handling of the kit complicated as the substance has constantly to be handled in an oxygen free atmosphere.

High purity and stability under dry and controlled conditions are pivotal requirements for chemical compounds used as active ingredients in pharmaceuticals.

The processes disclosed in prior art for the preparation of compound of Formula 4 involves that coupling reaction of benzyl phosphine of Formula 9 with ethyl vinyl ether carried out by using photolytic conditions. Such technology is expensive as it requires separate instruments including isolated facility (to avoid the UV radiation exposure etc.), also it is not suitable for commercial scale production.

Therefore, there is a need to provide a process for the preparation of tetrofosmin and its intermediates without using photolytic conditions.

The present invention is primarily to provide stabilized form of tetrofosmin, which is stable in contact with oxygen and allow an easier handling of the substance during synthesis, and quality control.

Many other publications describe the process for the preparation of tetrofosmin and its salt thereof. Still there is a need to develop a simple, cost effective, high yielding and easy to implement on industrial scale process for the preparation of tetrofosmin or acid addition salt thereof.

OBJECT OF THE INVENTION

The principal object of the present invention is to provide a process for the preparation of tetrofosmin or acid addition salt thereof, which alleviates the drawbacks of prior art processes.

One object of the present invention is to provide an improved, efficient, safe and convenient process for the preparation of tetrofosmin or acid addition salt thereof.

Another object of the present invention is to provide a process for preparation of tetrofosmin or acid addition salt thereof which involves the coupling the benzyl phosphine with vinyl ethyl ether to provide benzylbis(2-ethoxyethyl) phosphane; proviso that said coupling step is not carried out under photolytic conditions; and further converting benzylbis(2-ethoxyethyl)phosphane into tetrofosmin or acid addition salt thereof.

Further another object of the present invention is to provide a process for preparation of tetrofosmin disulfosalicylate salt.

Further yet another object of the present invention is to provide polymorphic form J of tetrofosmin disulfosalicylate salt.

SUMMARY OF THE INVENTION

In accordance with principal embodiment, the present invention provides a process for the preparation of tetrofosmin or acid addition salt thereof, comprising the steps of:

a) reduction of diethylbenzylphosphonate of Formula 8

Formula 8 by treating with a suitable reducing agent in presence of a suitable solvent, optionally in the presence of catalyst, to provide benzyl phosphine of Formula 9;

Formula 9 b) coupling the benzyl phosphine of Formula 9 with vinyl ethyl ether of Formula 3

Formula 3 in the presence of suitable solvent and catalyst to provide benzylbis(2-ethoxyethyl)phosphane of Formula 4; proviso that said coupling step is not carried out under photolytic conditions;

Formula 4 c) coupling of benzylbis(2-ethoxyethyl)phosphane of Formula 4 with 1,2-dibromoethane of Formula 10,

Formula 10 optionally using a suitable solvent, to provide ethane-1,2-diylbis(benzylbis(2-ethoxyethyl)phosphonium) bromide of Formula 11;

Formula 11 d) converting the ethane-1,2-diylbis(benzylbis(2-ethoxyethyl) phosphonium) bromide of Formula 11 using a suitable base in the presence of suitable solvent into ethane-1, 2-diylbis(bis(2-ethoxyethyl)phosphine oxide of Formula 12;

Formula 12 e) deoxygenating ethane-1, 2-diylbis(bis(2-ethoxyethyl) phosphine oxide of Formula 12 using the suitable reagent in the presence of suitable solvent to obtain tetrofosmin, and;

f) optionally, converting tetrofosmin into acid addition salt thereof.

In accordance with another embodiment, the present invention provides a process for the preparation of tetrofosmin or acid addition salt thereof comprising the steps of:

a) reduction of diethylbenzylphosphonate of Formula 8 by treating with lithium aluminium hydride in presence of solvent selected from ether, aliphatic or aromatic hydrocarbon and the like or mixture thereof to provide benzyl phosphine of Formula 9;

b) coupling the benzyl phosphine of Formula 9 with vinyl ethyl ether of Formula 3 in the presence of radical initiator, optionally using solvent, to provide benzylbis(2-ethoxyethyl)phosphane of Formula 4; proviso that said coupling step is not carried out under photolytic conditions;

c) coupling of benzylbis(2-ethoxyethyl)phosphane of Formula 4 with 1,2-dibromoethane of Formula 10 using solvent selected from ester, ketone, nitrile, aliphatic or aromatic hydrocarbons, ethers, halogenated hydrocarbons and the like or mixture thereof to provide ethane-1,2-diylbis(benzylbis(2-ethoxyethyl)phosphonium) bromide of Formula 11;

d) converting ethane-1,2-diylbis(benzylbis(2-ethoxyethyl)phosphonium) bromide of Formula 11 using aqu. sodium hydroxide in the presence of alcoholic solvent into ethane-1, 2-diylbis(bis(2-ethoxyethyl)phosphine oxide of Formula 12;

e) deoxygenating ethane-1, 2-diylbis(bis(2-ethoxyethyl)phosphine oxide of Formula 12 using hexachlorodisilane in the presence of aprotic solvent to obtain tetrofosmin, and;

f) optionally, converting tetrofosmin into acid addition salt thereof.

In accordance with further another embodiment, the present invention provides a process for the preparation of tetrofosmin or acid addition salt thereof, comprising the steps of:

a) reduction of diethylbenzylphosphonate of Formula 8 by treating with lithium aluminium hydride in presence of methyl tertiary butyl ether to provide benzyl phosphine of Formula 9;

b) coupling the benzyl phosphine of Formula 9 with vinyl ethyl ether of Formula 3 in the presence of α-azoisobutyronitrile (AIBN) to provide benzylbis(2-ethoxyethyl)phosphane of Formula 4; proviso that said coupling step is not carried out under photolytic conditions;

c) coupling of benzylbis(2-ethoxyethyl)phosphane of Formula 4 with 1,2-dibromoethane of Formula 10 using acetonitrile as solvent to provide ethane-1,2-diylbis(benzylbis(2-ethoxyethyl)phosphonium) bromide of Formula 11;

d) converting ethane-1,2-diylbis(benzylbis(2-ethoxyethyl)phosphonium) bromide of Formula 11 using aq. sodium hydroxide in the presence of ethanol as solvent into ethane-1, 2-diylbis(bis(2-ethoxyethyl)phosphine oxide of Formula 12;

e) deoxygenating ethane-1, 2-diylbis(bis(2-ethoxyethyl)phosphine oxide of Formula 12 using hexachlorodisilane in the presence of toluene as solvent to obtain tetrofosmin, and;

f) optionally, converting tetrofosmin into acid addition salt thereof.

In accordance with further yet another embodiment, the present invention provides a process for the preparation tetrofosmin or acid addition salt thereof comprising the steps of:

a) coupling of benzyl phosphine of Formula 9 with vinyl ethyl ether of Formula 3 to provide benzylbis(2-ethoxyethyl)phosphane of Formula 4; proviso that said coupling step is not carried out under photolytic conditions; and b) further converting compound of Formula 4 into tetrofosmin or acid addition salt thereof.

In accordance with yet another embodiment, the present invention provides a process for the preparation of tetrofosmin disulfosalicylate salt, comprising the steps of:

a) dissolving 5-sulfosalicylic acid in water;
b) contacting this reaction mixture with tetrofosmin, and;
c) isolating tetrofosmin disulfosalicylate salt.

In accordance with further yet another embodiment, the present invention provides a process for the preparation of tetrofosmin disulfosalicylate salt, comprising the steps of:

a) dissolving 5-sulfosalicylic acid in water;
b) contacting this reaction mixture with the solution of tetrofosmin, and;
c) isolating tetrofosmin disulfosalicylate salt.

In accordance with still further yet another embodiment, the present invention provides polymorphic form J of tetrofosmin disulfosalicylate salt comprising the steps of:

a) dissolving 5-sulfosalicylic acid in water;
b) contacting this reaction mixture with tetrofosmin, and;
c) isolating tetrofosmin disulfosalicylate salt.

DETAIL DESCRIPTION OF THE INVENTION

Figure 1:
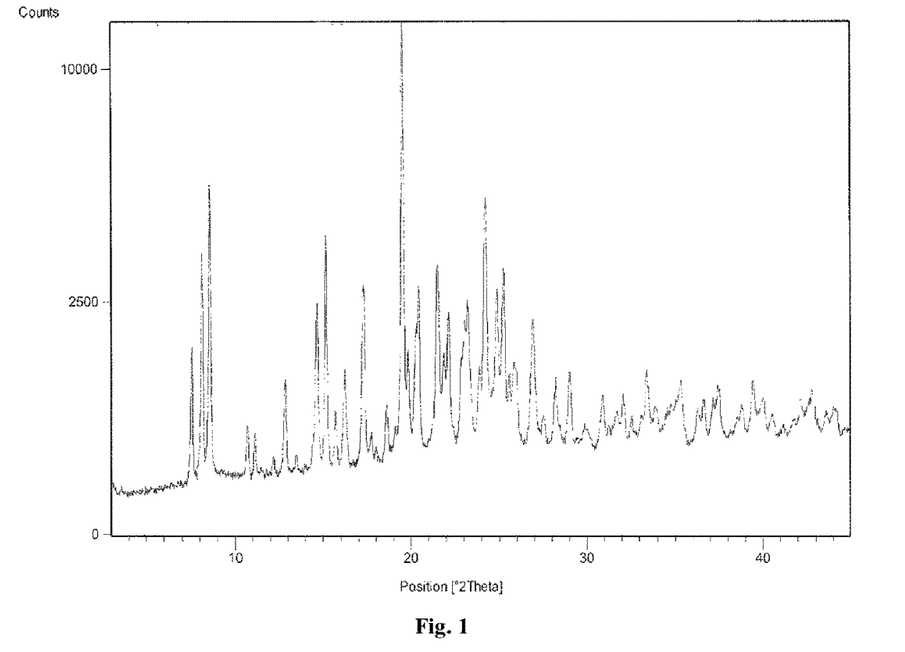
FIG. 1 is an illustration of an X-ray powder diffraction (XRPD) pattern of tetrafosmin disulfosalicylate salt obtained according to example 7.
Figure 2:
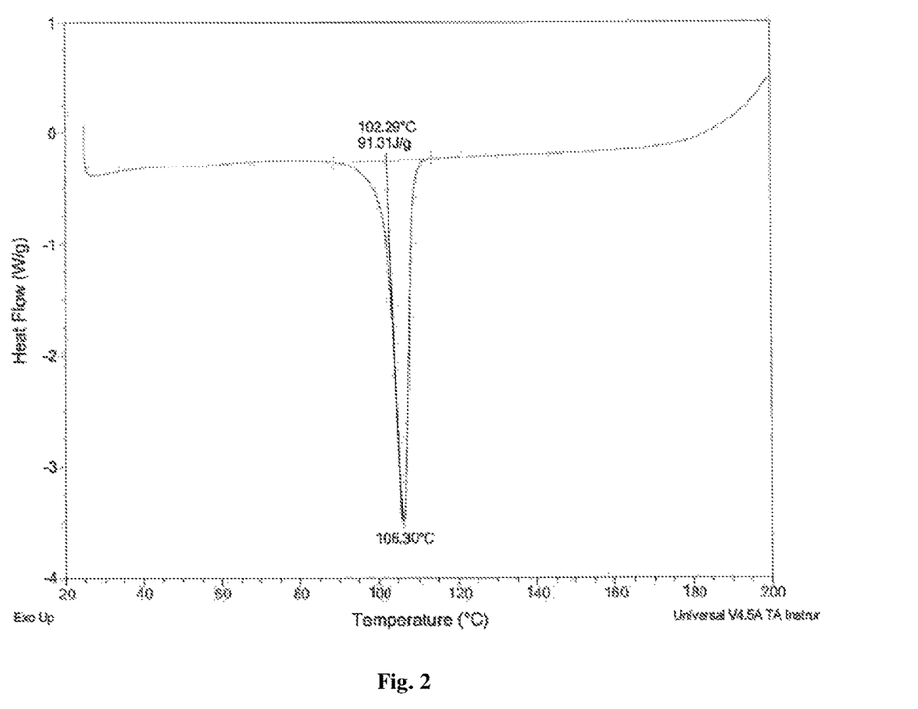
FIG. 2. is an illustration of a Differential Scanning Calorimetry (DSC) of tetrafosmin disulfosalicylate salt obtained according to example 7.

The present invention provides an efficient and industrially advantageous process for the preparation of tetrofosmin or acid addition salt thereof.

In accordance with principal embodiment, the present invention provides a process for the preparation of tetrofosmin or acid addition salt thereof, comprising the steps of:

a) reduction of diethylbenzylphosphonate of Formula 8;

Formula 8 by treating with a suitable reducing agent in presence of a suitable solvent, optionally in the presence of catalyst, to provide benzyl phosphine of Formula 9;

Formula 9 b) coupling the benzyl phosphine of Formula 9 with vinyl ethyl ether of Formula 3;

Formula 3 in the presence of suitable solvent and catalyst, to provide benzylbis(2-ethoxyethyl)phosphane of Formula 4; proviso that said coupling step is not carried out under photolytic conditions;

Formula 4 c) coupling of benzylbis(2-ethoxyethyl)phosphane of Formula 4 with 1,2-dibromoethane of Formula 10;

Formula 10 optionally in the presence of suitable solvent, to provide ethane-1,2-diylbis(benzylbis(2-ethoxyethyl)phosphonium) bromide of Formula 11;

Formula 11 d) converting ethane-1,2-diylbis(benzylbis(2-ethoxyethyl)phosphonium) bromide of Formula 11 using a suitable base in the presence of suitable solvent into ethane-1, 2-diylbis(bis(2-ethoxyethyl)phosphine oxide of Formula 12;

Formula 12 e) deoxygenating ethane-1, 2-diylbis(bis(2-ethoxyethyl) phosphine oxide of Formula 12 using the suitable reagent in the presence of suitable solvent to obtain tetrofosmin, and;

f) optionally, converting tetrofosmin into acid addition salt thereof.

In accordance with another embodiment, the present invention provides a process for the preparation of tetrofosmin or acid addition salt thereof, comprising the steps of:

a) reduction of diethylbenzylphosphonate of Formula 8 by treating with lithium aluminium hydride in presence of solvent selected from ether, aliphatic or aromatic hydrocarbons and the like or mixture thereof to provide benzyl phosphine of Formula 9;

b) coupling the benzyl phosphine of Formula 9 with vinyl ethyl ether of Formula 3 in the presence of radical initiator catalyst, optionally using solvent, to provide benzylbis(2-ethoxyethyl)phosphane of Formula 4; proviso that said coupling step is not carried out under photolytic conditions;

c) coupling of benzylbis(2-ethoxyethyl)phosphane of Formula 4 with 1,2-dibromoethane of Formula 10 using solvent selected from ester, ketone, nitrile, aliphatic or aromatic hydrocarbons, ethers, halogenated hydrocarbons and the like or mixture thereof to provide ethane-1,2-diylbis(benzylbis(2-ethoxyethyl)phosphonium) bromide of Formula 11;

d) converting ethane-1,2-diylbis(benzylbis(2-ethoxyethyl)phosphonium) bromide of Formula 11 using aqu. sodium hydroxide in the presence of alcoholic solvent into ethane-1, 2-diylbis(bis(2-ethoxyethyl)phosphine oxide of Formula 12;

e) deoxygenating ethane-1, 2-diylbis(bis(2-ethoxyethyl) phosphine oxide of Formula 12 using hexachlorodisilane in the presence of aprotic solvent to obtain tetrofosmin, and;

f) optionally, converting tetrofosmin into acid addition salt thereof.

First step involves reduction of diethylbenzylphosphonate of Formula 8 by treating with suitable reducing agent in the presence of suitable solvent and with or without use of the catalyst to provide benzyl phosphine of Formula 9. Generally reaction may be carried out at a temperature of −10 to 50° C. for few minutes to few hours or till completion of the reaction. Preferably reaction is conducted at a temperature of 20 to 40° C., more preferably reaction is conducted at a temperature of 25 to 35° C. and it takes 12 to 18 hours for completion of the reaction.

After completion of reaction, the benzyl phosphine of Formula 9 is isolated or may be without isolation proceed for the next step.

The reducing agent used at step a) may be selected from group comprising of alkali or alkaline metal hydride such as sodium hydride, sodium borohydride, lithium aluminium hydride (LAH), vitride, diisobutyl aluminium hydride, lithium trialkoxy aluminium hydride, preferably reducing agent used is lithium aluminium hydride.

The suitable solvent for reduction at step a) may be selected from group comprising of ethers, aliphatic or aromatic hydrocarbons and the like or mixture thereof. Ethers are selected from the group comprising of diethyl ether, methyl tert-butyl ether (MTBE), diisopropyl ether, tetrahydrofuran (THF), dioxane; aliphatic or aromatic hydrocarbons hexane, heptane, toluene, xylene, benzene and the like or mixture thereof, preferably suitable solvent used is methyl tert-butyl ether (MTBE).

Next step involves coupling of benzyl phosphine of Formula 9 with vinyl ethyl ether of Formula 3 in the presence of suitable solvent and catalyst to provide compound of Formula 4. This said step of coupling is not be carried out using photolytic conditions. Generally reaction may be carried out at a temperature of 60° C. to reflux temperature for few minutes to few hours or till completion of reaction. Preferably reaction is conducted at a temperature of 70° C. to reflux temperature, more preferably reaction is conducted at a temperature of 80 to 90° C. for 18 to 26 hours.

Catalyst used for coupling at step b) may be selected from radical initiator compounds such α-azo-isobutyronitrile (AIBN), 1,1'-azobis(cyclohexanecarbonitrile) (ABCN), tertamyl peroxybenzoate, 4,4-azobis(4-cyanovaleric acid), 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, Bis(1-(tert-butyl peroxy)-1-methyl ethyl) benzene, 1,1-bis(tert-butylperoxy)-3,3,5-trimethylcyclohexane, tert-butylhydro peroxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate benzoyl peroxide ((Ph COO)$_2$), methyl ethyl ketone peroxide, acetone peroxide; preferably catalyst used is α-azo-isobutyronitrile (AIBN).

Further after isolating compound of Formula 4 or may be without isolation reacted with 1, 2-dibromoethane of Formula 10 in the presence or absence of suitable solvent to provide compound of Formula 11. Generally reaction may be carried out at a temperature of 60° C. to reflux temperature for few minutes to few hours or till completion of reaction. Preferably reaction is conducted at a temperature of 70° C. to reflux temperature, more preferably reaction is conducted at a temperature of 80 to 90° C. for 16 to 24 hours.

The suitable solvent for coupling at step c) includes but not limited to organic solvents selected from the group comprising of esters, ketone, nitrile, aliphatic or aromatic hydrocarbons, ethers or mixture thereof. Preferably, selected from ethyl acetate, propyl acetate, butyl acetate, acetone, propanone, butanone, methyl isobutyl ketone, acetonitrile (ACN), butyronitrile, acrylonitrile, toluene, xylenes, diethyl ether, methyl tert-butyl ether (MTBE), diisopropyl ether, tetrahydrofuran (THF), dioxane and the like or mixture thereof, more preferably solvent used is acetonitrile (ACN).

The conversion of compound of Formula 11 into compound of Formula 12 is conducted by using suitable base and solvent. Generally hydrolysis may be carried out at a temperature of 20° C. to reflux temperature for few minutes to few hours or till completion of reaction. Preferably hydrolysis is conducted at a temperature of 20° C. to 60° C., more preferably hydrolysis is conducted at a temperature of 25 to 35° C. for 8 to 14 hours.

The suitable solvent used at step d) includes but not limited to organic solvents selected from the group comprising of water, alcohols, nitrile and the like or mixture thereof. Preferably, selected from methanol, ethanol, propanol, isopropanol, butanol, more preferably solvents used are ethanol and water.

The base used at step d) may be selected from organic or inorganic base, wherein inorganic base is selected from alkali or alkaline earth metal hydroxides, carbonates, bicarbonates selected from such as sodium hydroxide, potassium hydroxide, calcium hydroxide, magnesium hydroxide, cesium hydroxide, sodium carbonate, potassium carbonate, calcium carbonate, magnesium carbonate, cesium carbonate, sodium bicarbonate, potassium bicarbonate, calcium bicarbonate, magnesium bicarbonate, cesium bicarbonate, and the like or mixture thereof; preferably base used is sodium hydroxide.

Further step involve deoxygenating compound of Formula 12 using the suitable reagent in the presence of suitable solvent to obtain tetrofosmin Generally reaction may be carried out at a temperature of 60° C. to reflux temperature for few minutes to few hours or till completion of reaction. Preferably reaction is conducted at a temperature of 70° C. to reflux temperature, more preferably reaction is conducted at a temperature of 80 to 90° C. for 8 to 14 hours.

The suitable reagent for deoxygenating at step e) may be selected from hexachlorodisilane, trichlorosilane, alkyl dichlorosilane, preferably reagent used is hexa chlorodisilane.

The suitable solvent for deoxygenating at step e) includes but not limited to organic solvents selected from the group comprising of aliphatic or aromatic hydrocarbons, chloro solvents and the like or mixture thereof. Preferably solvent used is selected from hexane, heptane, toluene, xylene, benzene, more preferably solvent used is toluene.

Further converting tetrofosmin into its acid addition salt thereof by reacting with the suitable acid.

The suitable acid used for preparation of tetrafosmin acid addition salt thereof may be selected from hydrochloric acid, hydrobromic acid, sulfosalicylic acid, tartaric acid, succinic acid, gentisic acid and like thereof.

In accordance with further another embodiment, the present invention provides a process for the preparation of tetrofosmin or acid addition salt thereof, comprising the steps of:
a) reduction of diethylbenzylphosphonate of Formula 8 by treating with lithium aluminium hydride in presence of methyl tertiary butyl ether to provide benzyl phosphine of Formula 9;
b) coupling the benzyl phosphine of Formula 9 with vinyl ethyl ether of Formula 3 in the presence of α-azo-isobutyronitrile (AIBN) to provide benzylbis(2-ethoxyethyl)phosphane of Formula 4; proviso that said coupling step is not carried out under photolytic conditions;
c) coupling of benzylbis(2-ethoxyethyl)phosphane of Formula 4 with 1,2-dibromoethane of Formula 10 using acetonitrile as solvent to provide ethane-1,2-diylbis(benzylbis(2-ethoxyethyl)phosphonium) bromide of Formula 11;
d) converting ethane-1,2-diylbis(benzylbis(2-ethoxyethyl)phosphonium) bromide of Formula 11 using aqu. sodium hydroxide in the presence of ethanol as solvent into ethane-1, 2-diylbis(bis(2-ethoxyethyl)phosphine oxide of Formula 12;
e) deoxygenating ethane-1, 2-diylbis(bis(2-ethoxyethyl) phosphine oxide of Formula 12 using hexachlorodisilane in the presence of toluene as solvent to obtain tetrofosmin, and;
f) optionally, converting tetrofosmin into acid addition salt thereof.

In accordance with further yet another embodiment, the present invention provides a process for the preparation tetrofosmin or acid addition salt thereof comprising the steps of:
a) coupling of benzyl phosphine of Formula 9 with vinyl ethyl ether of Formula 3 to provide benzylbis(2-ethoxyethyl)phosphane of Formula 4; proviso that said coupling step is not carried out under photolytic conditions; and,
b) further converting compound of Formula 4 into tetrofosmin or acid addition salt thereof.

In accordance with yet another embodiment, the present invention provides a process for the preparation of tetrofosmin disulfosalicylate salt, comprising the steps of:
a) dissolving 5-sulfosalicylic acid in water;
b) adding this reaction mixture into tetrofosmin, and;
c) isolating tetrofosmin disulfosalicylate salt.

In accordance with further yet another embodiment, the present invention provides a process for the preparation of tetrofosmin disulfosalicylate salt comprising the steps of:
a) dissolving 5-sulfosalicylic acid in water;
b) contacting this reaction mixture with the solution of tetrofosmin, and;
c) isolating tetrofosmin disulfosalicylate salt.

The solvent used for the preparation of solution at step b) may be selected from group comprising of water, alcohol, nitrile and the like or mixture thereof, preferably solvent used is water.

In accordance with still further yet another embodiment, the present invention provides polymorphic form J of tetrofosmin disulfosalicylate salt comprising the steps of:
a) dissolving 5-sulfosalicylic acid in water;
b) contacting this reaction mixture with tetrofosmin, and;
c) isolating tetrofosmin disulfosalicylate salt.

The impurity is formed along with the compound of formula 11, which was characterized by LCMS at m/z 285. The said impurity was further removed by contacting with the solvent such as ketonic solvent, preferably acetone.

The MYOVIEW 30 mL kit is supplied as a pack of five multi-dose vials for use in the preparation of a technetium Tc99m tetrofosmin intravenous injection to be used for the scintigraphic delineation of regions of reversible myocardial ischemia in the presence or absence of infarcted myocardium and for the evaluation of ventricular function. Each vial contains a predispensed, sterile, non-pyrogenic, lyophilized mixture of 1.38 mg tetrofosmin [6,9-bis(2-ethoxyethyl)-3,12-dioxa-6,9 diphosphatetradecane], 0.09 mg stannous chloride dihydrate (minimum stannous tin 0.015 mg; total stannous and stannic tin 0.0522 mg), 1.92 mg disodium sulphosalicylate, 3 mg sodium D-gluconate, 11 mg sodium hydrogen carbo-nate, and 3 mg ascorbic acid. The lyophilized powder is sealed under a nitrogen atmosphere with a rubber closure. The product contains no antimicrobial preservative MYOVIEW (Drug Product)

The kit comprises five vials containing a sterile, non-pyrogenic, freeze dried mixture of tetrofosmin, stannous chloride dihydrate, disodium sulphosalicylate, sodium D-Gluconate and sodium hydrogen carbonate, together with appropriate number of radiation labels, and a package insert.

Each MYOVIEW vial contains a pre-dispensed, sterile, non-pyrogenic, lyophilized mixture of 0.23 mg tetrofosmin [6,9-bis(2-ethoxyethyl)-3,12-dioxa-6,9-diphosphatetradecane], 30 µg stannous chloride dihydrate (minimum stannous tin 5.0 µg; maximum total stannous and stannic tin 15.8 µg), 0.32 mg disodium sulphosalicylate and 1.0 mg sodium D-gluconate, and 1.8 mg sodium hydrogen carbonate. The lyophilized powder is sealed under a nitrogen atmosphere with a rubber closure and contains no antimicrobial preservative.

Major advantages realized in the present invention are that process does not involve use of the photolytic reaction for preparation of intermediate of Formula 4, other intermediates are stable and solid which can be isolated, purified by crystallization, conveniently scaled-up for industrial scale production of tetrofosmin or acid addition salt thereof. The process is simple economic with high throughput, operationally efficient and environment friendly.

Although the following examples illustrate the present invention in more detail but the examples are not intended in any way to limit the scope of the present invention. It will thus be readily apparent to the one skilled in the art that varying substitutions and modifications may be made to the invention disclosed herein without departing from the scope and spirit of the invention. Thus, it should be understood that although the present invention has been specifically disclosed by preferred embodiments and optional features, modifications and variation of the concepts herein disclosed may be resorted to by those skilled in the art and that such modifications and variations are considered to be falling within the scope of the invention.

Example 1

Preparation of Benzyl Phosphine

A mixture of lithium aluminium hydride (25 g) in methyl tertiary butyl ether (MTBE) (800 ml) was cooled to 0 to 5° C. and added a solution of diethylbenzylphosphonate in methyl tertiary butyl ether (100 g in 200 ml). The temperature of reaction mixture was raised to 25 to 30° C. and stirred for 14 to 16 hour. After completion of the reaction, the reaction mixture was cooled to 0 to 5° C. and 6N hydrochloric acid was added slowly. Further raised the temperature of reaction mixture to 25 to 30° C. and stirred for 30-45 minutes. The layers were separated, the aqueous layer was extracted with MTBE (250 ml) and the combined organic layer was washed with deoxygenated water. The organic layer was dried over sodium sulfate and concentrated to obtain the title compound as non-distillable liquid.

Example 2

Preparation of benzylbis(2-ethoxyethyl)phosphane

To a mixture of benzyl phosphine (obtained from example 1) and vinyl ethyl ether (250 ml) in pressure RB flask was added α-azo-isobutyronitrile (AIBN) (1.5 g). The resulting reaction mixture was maintained at 80 to 90° C. for 14 to 16 hours. The mixture was cooled to 20 to 30° C. and AIBN (0.5 g) added, then continued to heat the reaction mixture at 80 to 90° C. for 6 to 7 hours. After completion of the reaction, the reaction mixture was allowed to cool to room temperature and distilled under vacuum to obtain title compound as an oil (107 g).

Example 3

Preparation of Ethane-1,2-diylbis (benzylbis(2-ethoxyethyl) Phosphonium) Bromide To a mixture of benzylbis(2-ethoxyethyl)phosphane 107.g) in acetonitrile (100 ml) in pressure bottle was added 1, 2-dibromoethane (30.5 g). The reaction mixture was maintained at 80 to 90° C. for 20 to 25 hours. After completion of the reaction, the reaction mass was cooled to room temperature and stirred for 45 to 60 minutes to obtain the solid. To the solid obtained was added methyl tertiary butyl ether (MTBE) (500 ml) and stirred at room temperature for 2 to 3 hour. The reaction mass was filtered, washed with MTBE and suck dried. Further the filtered solid was heated in acetone (400 ml) at 50 to 55° C. for 2 to 3 hour. Then cooled the reaction mixture to room temperature, stirred, filtered and washed with acetone to obtain the title compound as white solid. (85 g)

Example 4

Preparation of Ethane-1, 2-diylbis (bis (2-ethoxyethyl) Phosphine Oxide)

To a mixture of Ethane-1,2-diylbis (benzylbis(2-ethoxyethyl) phosphonium) bromide (80 g) in ethanol (480 ml) was added an aq. solution of sodium hydroxide (48 g in 160 ml water) at room temperature. The reaction mass was maintained at 25 to 35° C. for 10 to 12 hour. After completion of the reaction, the reaction mass was conc. under vacuum to obtained the residue. The residue was dissolved in deoxygenated water (400 ml) and washed with MTBE (400 ml×2).

The layers were separated, the aqueous layer was cooled to 10 to 20° C. and 6N hydrochloric acid (200 ml) was added slowly. Then extracted the aqueous layer with dichloromethane (2000 ml), washed the organic layer with deoxygenated water (160 ml), dried the organic layer using sodium sulfate, filtered, and distilled under vacuum to obtain the residue. Further MTBE (160 ml×2) was added to the residue and continued distillation under vacuum, degassed to obtain the solid. To the obtained solid, MTBE (400 ml) was added and heated at 45 to 50° C. for 1-2 hour, further slowly cooled the reaction mass to 25 to 30° C., filtered the solid product. Again MTBE (400 ml) was added to the solid product and heated at 45 to 50° C. for 1-2 hour, further slowly cooled the reaction mass to 25 to 30° C., filtered, washed with MTBE and dried under vacuum to obtain the title compound as white solid (32 g).

Example 5

Preparation of Tetrofosmin Free Base

To a mixture of ethane-1, 2-diylbis (bis (2-ethoxyethyl) phosphine oxide (18 g) in toluene (180 ml) in pressure RB flask argon/nitrogen gas was purged for 5 minute and hexachlorodisilane (30 g) was added. The reaction mixture was heated to 80 to 90° C., stirred for 10 to 12 hour, further slowly cooled to −5 to 0° C. and slowly added 30% aqueous sodium hydroxide solution (45 g sodium hydroxide in 150 ml deoxygenated water) the temperature of reaction mixture was raised to 25 to 30° C. and stirred for 1 to 2 hour. The layers were separated and the aq. layer was extracted with Toluene (180 ml). The combined organic layer was washed with deoxygenated water (180 ml). Further dried the organic layer using sodium sulfate, distilled under vacuum to obtain the residue of tetrofosmin free base (15.5 g).

Example 6

Preparation of Tetrofosmin Disulfosalicylate Salt

To the residue of tetrofosmin free base (15.5 g) was added an aq. solution of 5-sulfosalicylic acid dihydrate (21.6 g in 75 ml deoxygenated water) and stirred at 25 to 30° C. for 25 to 30 minutes. Further heated the reaction mass to 55 to 60° C., stirred for 15 to 30 minute, slowly cooled the reaction mass to 10 to 15° C. and stirred for 1-2 hour. Filtered, washed with chilled deoxygenated water, and dried under vacuum to obtain the title compound as white solid. (30 g).

Example 7

Preparation of Form J of Tetrofosmin Disulfosalicylate Salt

An aq. solution of 5-sulfosalicylic acid dihydrate (21.6 g in 75 ml deoxygenated water) was added slowly into tetrofosmin free base (15.5 g) and stirred at room temperature for 30 to 40 minutes. The temperature of reaction mixture was further raised to 50 to 60° C., stirred for 20 to 30 minute, cooled the reaction mass to 10 to 15° C. and stirred for 1-2 hour. Filtered, washed with chilled deoxygenated water, and dried under vacuum to obtain the title compound.

We claim:
1. A process for the preparation of tetrofosmin or acid salt thereof, comprising:

a) reducing diethylbenzylphosphonate of Formula 8

Formula 8 by treating with a suitable reducing agent in the presence of a suitable solvent, optionally in the presence of catalyst, to provide benzyl phosphine of Formula 9;

Formula 9 b) coupling the benzyl phosphine of Formula 9 with vinyl ethyl ether of Formula 3

Formula 3 using a catalyst, optionally in the presence of a suitable solvent to provide benzylbis(2-ethoxyethyl)phosphane of Formula 4, with the proviso that said coupling step is not carried out under photolytic conditions;

Formula 4 c) coupling of benzylbis(2-ethoxyethyl)phosphane of Formula 4 with 1,2-dibromoethane of Formula 10,

Formula 10 optionally using a suitable solvent, to provide ethane-1,2-diylbis(benzylbis(2-ethoxyethyl)phosphonium) bromide of Formula 11;

Formula 11 d) converting the ethane-1,2-diylbis(benzylbis(2-ethoxy-ethyl) phosphonium) bromide of Formula 11 using a suitable base in the presence of suitable solvent into ethane-1, 2-diylbis(bis(2-ethoxyethyl)phosphine oxide of Formula 12;

Formula 12 e) deoxygenating ethane-1, 2-diylbis(bis(2-ethoxyethyl) phosphine oxide of Formula 12 using the suitable reagent in the presence of suitable solvent to obtain tetrofosmin; and f) optionally, converting tetrofosmin into an acid salt thereof.

2. A process for the preparation of tetrofosmin or acid salt thereof according to claim 1, comprising the steps of:
a) reduction of diethylbenzylphosphonate of Formula 8 by treating with lithium aluminium hydride in presence of solvent selected from ether, aliphatic or aromatic hydrocarbon and mixture thereof to provide benzyl phosphine of Formula 9;
b) coupling the benzyl phosphine of Formula 9 with vinyl ethyl ether of Formula 3 in the presence of radical initiator, optionally using solvent, to provide benzylbis(2-ethoxyethyl)phosphane of Formula 4, with the proviso that said coupling step is not carried out under photolytic conditions;
c) coupling of benzylbis(2-ethoxyethyl)phosphane of Formula 4 with 1,2-dibromoethane of Formula 10 using solvent selected from ester, ketone, nitrile, aliphatic or aromatic hydrocarbons, ethers, halogenated hydrocarbons and mixture thereof to provide ethane-1,2-diylbis(benzylbis(2-ethoxyethyl)phosphonium) bromide of Formula 11;
d) converting ethane-1,2-diylbis(benzylbis(2-ethoxy-ethyl)phosphonium) bromide of Formula 11 using aqu. sodium hydroxide in the presence of alcoholic solvent into ethane-1, 2-diylbis(bis(2-ethoxyethyl)phosphine oxide of Formula 12;
e) deoxygenating ethane-1, 2-diylbis(bis(2-ethoxyethyl) phosphine oxide of Formula 12 using hexachlorodisilane in the presence of aprotic solvent to obtain tetrofosmin; and
f) optionally, converting tetrofosmin into acid salt thereof.

3. The process according to claim 1, wherein in step a) a reducing agent used is an alkali metal hydride or a alkaline metal hydride; a solvent used is selected from the group consisting of ethers, aliphatic hydrocarbons, aromatic hydrocarbons, and mixture thereof, wherein said ethers are selected from the group consisting of diethyl ether, methyl tert-butyl ether (MTBE), diisopropyl ether, tetrahydrofuran (THF), and dioxane; wherein said aliphatic hydrocarbons or said aromatic hydrocarbons are selected from the group consisting of hexane, heptane, toluene, xylene, benzene and mixture thereof wherein in step b) a catalyst used is a radical initiator.

4. The process according to claim 1, wherein in step c), the solvent used is selected from the group consisting of esters, ketone, nitrile, aliphatic hydrocarbons, aromatic hydrocarbons, ethers and mixture thereof wherein in step d), a solvent used is selected from the group consisting of water, alcohols, nitrile and mixture thereof and a base used is selected from the group consisting of an organic base, and an inorganic base, wherein the inorganic base used is selected from the group consisting of alkali earth metal hydroxides, alkaline earth metal hydroxides, carbonates and bicarbonates.

5. The process according to claim 1, wherein in step e), a reagent used for deoxygenating is selected from the group consisting of hexachlorodisilane, trichlorosilane and alkyl dichlorosilane; and solvent used is selected from the group consisting of aliphatic hydrocarbons, aromatic hydrocarbons, chloro solvents and a mixture thereof.

6. A process for the preparation of tetrofosmin or acid salt thereof according to claim 1, comprising the steps of:
a) reduction of diethylbenzylphosphonate of Formula 8 by treating with lithium aluminium hydride in presence of methyl tertiary butyl ether to provide benzyl phosphine of Formula 9;
b) coupling the benzyl phosphine of Formula 9 with vinyl ethyl ether of Formula 3 in the presence of α-azo-isobutyronitrile (AIBN) to provide benzylbis(2-ethoxyethyl)phosphane of Formula 4, with the proviso that said coupling step is not carried out under photolytic conditions;
c) coupling of benzylbis(2-ethoxyethyl)phosphane of Formula 4 with 1,2-dibromoethane of Formula 10 using acetonitrile as solvent to provide ethane-1,2-diylbis(benzylbis(2-ethoxyethyl)phosphonium) bromide of Formula 11;
d) converting ethane-1,2-diylbis(benzylbis(2-ethoxy-ethyl)phosphonium) bromide of Formula 11 using aq. sodium hydroxide in the presence of ethanol as solvent into ethane-1, 2-diylbis(bis(2-ethoxyethyl)phosphine oxide of Formula 12;
e) deoxygenating ethane-1, 2-diylbis(bis(2-ethoxyethyl) phosphine oxide of Formula 12 using hexachlorodisilane in the presence of toluene as solvent to obtain tetrofosmin; and
f) optionally, converting tetrofosmin into acid salt thereof.

7. A process for the preparation tetrofosmin or acid salt thereof according to claim 1, comprising the steps of:
a) coupling of benzyl phosphine of Formula 9 with vinyl ethyl ether of Formula 3 to provide benzylbis(2-ethoxyethyl)phosphane of Formula 4 with the proviso that said coupling step is not carried out under photolytic conditions; and;
b) further converting the compound of Formula 4 into tetrofosmin or acid salt thereof.

8. A process for the preparation of tetrofosmin disulfosalicylate salt according to claim 1, further, comprising the steps of:
a) dissolving 5-sulfosalicylic acid in water;
b) contacting this reaction mixture with tetrofosmin or its solution thereof; and
c) isolating tetrofosmin disulfosalicylate salt.

9. The process according to claim 8, wherein in step b) solvent used for the preparation of solution of tetrofosmin is selected from water, alcohol, nitrile and mixture thereof.

10. A process for the preparation of polymorphic form J of tetrofosmin disulfosalicylate salt according to claim 8, comprising the steps of:
a) dissolving 5-sulfosalicylic acid in water;
b) contacting this reaction mixture with tetrofosmin; and
c) isolating tetrofosmin disulfosalicylate salt.

11. The process according to claim 3, wherein the alkali metal hydride or the alkaline metal hydride is selected from the group consisting of sodium hydride, sodium borohydride, lithium aluminium hydride (LAH), vitride, diisobutyl aluminium hydride, and lithium trialkoxy aluminium hydride.

12. The process according to claim 3, wherein the radical initiator compound is selected from the group consisting of α-azo-isobutyronitrile (AIBN), 1,1'-azobis(cyclohexanecarbonitrile) (ABCN), tert-amyl peroxybenzoate, 4,4-azobis(4-cyanovaleric acid), 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2, 5-dimethyl-3-hexyne, Bis(1-(tert-butyl peroxy)-1-methyl ethyl) benzene, 1,1-bis(tert-butylperoxy)-3,3,5-trimethylcyclohexane, tert-butylhydro peroxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate benzoyl peroxide ((PhCOO)$_2$), methyl ethyl ketone peroxide and acetone peroxide.

13. The process according to claim 4, wherein the base is selected from the group consisting of sodium hydroxide, potassium hydroxide, calcium hydroxide, magnesium hydroxide, cesium hydroxide, sodium carbonate, potassium carbonate, calcium carbonate, magnesium carbonate, cesium carbonate, sodium bicarbonate, potassium bicarbonate, calcium bicarbonate, magnesium bicarbonate, cesium bicarbonate and mixture thereof.

\* \* \* \* \*